(12) United States Patent
Gaia et al.

(10) Patent No.: US 8,800,287 B2
(45) Date of Patent: Aug. 12, 2014

(54) COGENERATIVE ORC SYSTEM

(75) Inventors: Mario Gaia, Brescia (IT); Roberto Bini, Brescia (IT)

(73) Assignee: Turboden S.R.L., Brescia (IT)

( * ) Notice: Subject to any disclaimer, the term of this patent is extended or adjusted under 35 U.S.C. 154(b) by 200 days.

(21) Appl. No.: 13/580,209

(22) PCT Filed: Mar. 9, 2011

(86) PCT No.: PCT/IT2011/000061
§ 371 (c)(1),
(2), (4) Date: Aug. 21, 2012

(87) PCT Pub. No.: WO2011/111082
PCT Pub. Date: Sep. 15, 2011

(65) Prior Publication Data
US 2012/0313371 A1    Dec. 13, 2012

(30) Foreign Application Priority Data
Mar. 10, 2010  (IT) .............................. BS2010A0046

(51) Int. Cl.
*F01K 25/00*  (2006.01)
(52) U.S. Cl.
USPC ............................................. 60/671; 60/653
(58) Field of Classification Search
USPC .......................................... 60/651, 653, 671
See application file for complete search history.

(56) References Cited

U.S. PATENT DOCUMENTS

| | | | | |
|---|---|---|---|---|
| 3,686,867 A | * | 8/1972 | Hull | ................................ 60/667 |
| 4,087,976 A | * | 5/1978 | Morrow et al. | ................. 60/643 |
| 4,503,682 A | * | 3/1985 | Rosenblatt | ...................... 60/671 |
| 8,215,114 B2 | * | 7/2012 | Smith et al. | ...................... 60/657 |
| 2003/0213248 A1 | | 11/2003 | Osborne et al. | |

FOREIGN PATENT DOCUMENTS

DE         1233211 B      1/1967

* cited by examiner

*Primary Examiner* — Hoang Nguyen
(74) *Attorney, Agent, or Firm* — Lucas & Mercanti, LLP

(57) ABSTRACT

The invention is directed to an ORC (Organic Rankine Cycle) system at least partially co-generative for the production of electric energy and the heating of a fluid. The system includes at least two regenerative exchangers positioned in series on the route of the work fluid between the exit of an electric expander-generator group and the entrance of a condenser of the ORC system, and a heat exchanger-user connected by means of an offtake line to at least one of said regenerative exchangers to receive from them a part of the capacity of work fluid and crossed by the user fluid to be heated by means of a thermal exchange with said capacity of work fluid. A part of the capacity of the work fluid on exiting from the user exchanger is returned to the same regenerative exchanger.

11 Claims, 5 Drawing Sheets

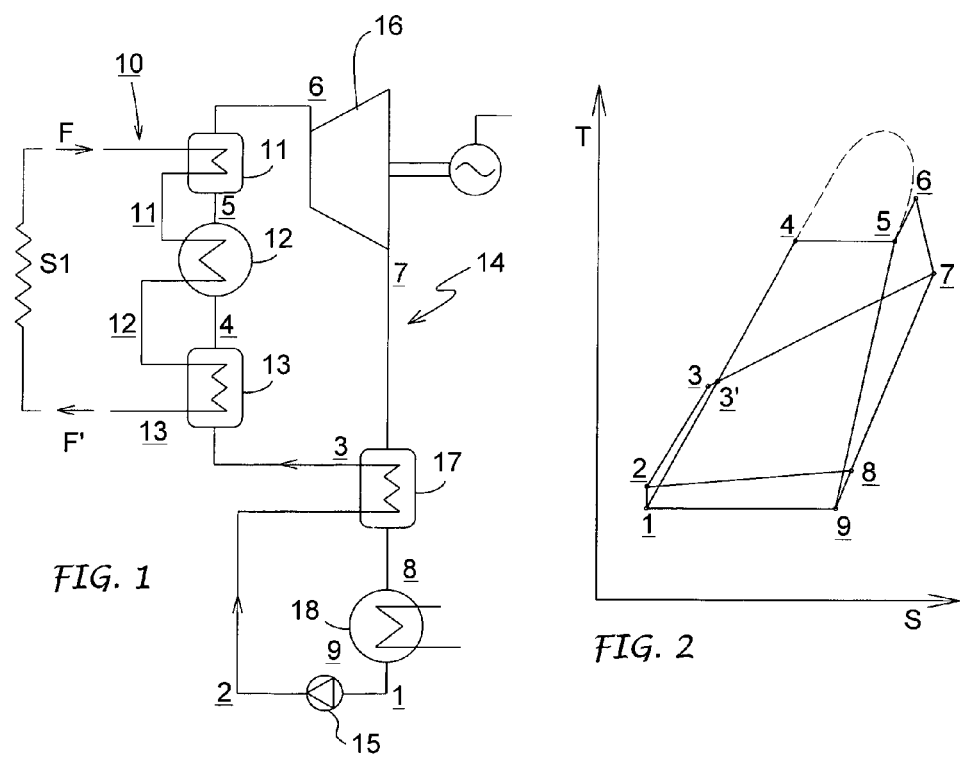
FIG. 1
FIG. 2
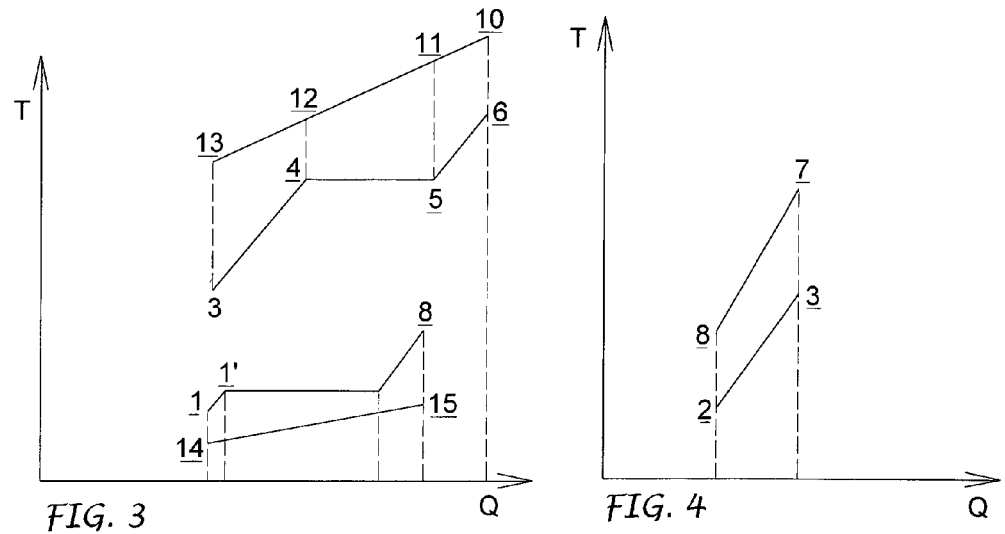
FIG. 3
FIG. 4

COGENERATIVE ORC SYSTEM

CROSS-REFERENCE TO RELATED APPLICATIONS

This application is a 371 of PCT/IT2011/000061, filed Mar. 9, 2011, which claims the benefit of Italian Patent Application No. BS2010A000046, filed Mar. 10, 2010, the contents of each of which are incorporated herein by reference.

FIELD OF THE INVENTION

The present invention relates to in general to the field of ORC (Organic Rankine Cycle) systems and refers in particular to an ORC system which is at least partially co-generative for a production of electric energy and a hot fluid.

STATE OF THE TECHNIQUE

The ORC systems are usable to transform a thermal power into electric power in the measure allowed by thermodynamic laws and by other possible bindings, such as the limits of the available space, the impact on the ambient and problems connected with safety, economic limits and time for the fulfilment.

The ORC systems are gradually increasing above all in two ambits.

In a first ambit, an ORC system can be used for the utilization of thermal sources with relatively high temperatures characterized by a thermal power entering modestly, corresponding to an electric power produced mainly lower than 10 MW. As an example a significant number of ORC systems use the combustion of a biomass in a boiler to produce heat and for example to heat a diathermic oil: in this case the hot source for the ORC system is made up of diametric oil with a temperature of about 300° C.

In a second ambit, an ORC system may be used for electric powers also much higher, but it is characterized by a particularly low temperature of the heating source. This is the case, for example, of the exploitation of the so-called geothermic energy at a low enthalpy.

With reference to the class of the ORC systems with a relatively high temperature, it is often possible to obtain a cogenerative asset for the system, where, that is, it is possible to discharge the thermal power released from the machine to a system positioned downstream that carries out a useful use. Apart from a few exceptions, the fact of to usefully using the downloaded heat means that this is used at a rather high temperature. In this way a typical example can be constituted by the use of the heat for teleheating, in which the heat is transferred by an ORC system to a flow of water that becomes heated up to 20-30° C. starting from a minimum temperature of about 60° C.

According to the state of the technique, and as shown schematically in FIG. 1 of the appended drawings, an ORC system basically comprises:

a thermal source S1 heating a vector fluid;

a primary circuit 10 for the vector fluid, that comes from and returns to said S1 heating source according to the arrow F, F', placed in circulation by means of at least a recycling pump—non shown in the drawing;

a thermal exchange group that can includes an overheater 11, an evaporator 12 and a pre-heater 13 for the exchange of heat between the fluid vector and an organic work fluid, circulating in a relative work circuit 14 by means of at least a pump 15, an expander 16, typically made by a turbine group, fed by the work fluid exiting from the thermal exchange group and in general followed by a re-generator 17, and a condenser group 18.

In an ORC cycle as represented in FIG. 2 on the thermodynamic plane entropy (S)-Temperature (T) the points indicated and which, furthermore, correspond to the homologous points on the scheme of the system in FIG. 1, have the following meaning:

1. pump entrance
2. pump exit
3. regenerator exit temperature (liquid, saturated liquid)
4. end of preheating
5. end of evaporation
6. end of overheating/expander entrance
7. expander exit/regenerator entrance
8. regenerator exit/condenser inlet
9. start condensation.

In FIG. 3 are shown the thermal exchange diagrams at the exchangers for introduction and deduction of the heat, respectively from the heat source (line 10, 11, 12, 13)—that is to say in the ambit of the thermal exchange group 11-13 and towards the cold source (line 14, 15), that is to say the condenser 18.

In FIG. 4 there are represented the diagrams relative to the thermal exchange inside the cycle that takes place in the regenerator component. The thermal exchange phenomena are all represented in the Exchanged power (Q)-Temperature (T) plane.

In an ORC system in the co-generative asset to make sure that the thermal power at the cold source, that is to say the fluid that removes thermal power from the condenser, is yielded at a temperature suitable for its use and the pressure needs to be raised and also the condensation temperature of the work fluid. This provision is evidently self-defeating in terms of output of the cycle.

However, the fact that usefully using the heat discharged from the expander 16 in general largely compensates the decrease in efficiency of the cycle and therefore the decrease in electric production equal to the thermal power entering at a high temperature. However there exists a wide range of applications for ORC so that a certain thermal power to be usefully used is required, and however it deals with a small fraction of the power available at the condenser 18 of the system.

In this case the provision to increase the condensation temperature is not an advantage, because the worsening of the yield is a consequence of the increase of the drop in the thermal level of the entire thermal power released by the ORC system, whereas a high temperature is required only for a modest part of the discharged heat. All the more reason why the provision to raise the condensation temperature is not an advantage should the thermal request be limited for a brief period compared with the annual operating time of the machine and for an even greater reason when the temperature at which the useful heat is required are both high compared to the condensation temperature corresponding to the requirement to yield the superfluous heat to the ambient.

Objective of the Invention

This invention is applied to the ORC systems provided with a regenerator and has as an objective to efficiently avoid the necessity to confer thermal power to a thermal consumer downstream of the ORC system without having to raise the condensation temperature and consequently lower the yield in electric terms of the machine itself.

Furthermore, the invention also applies efficiently to the ORC systems with a condensation suitable to the cogeneration in which a further thermal power with higher temperatures compared to the heat downloaded from the condenser is available.

The objective of the invention is achieved by an ORC system at least partially co-generative according to the preamble of claim 1 and furthermore comprising at least two regenerative exchangers placed in series on the route of the work fluid between the exit of the electric expander-generator group and the condenser of the ORC system, and at least an additional heat exchanger connected to at least one of said regenerative exchangers, to receive from them at least one part of the capacity of work fluid, and crossed by the user fluid to be heated by a thermal exchange with said capacity of work fluid, the part of the derived work fluid being sent back to the same regenerative exchanger.

In particular, to receive a part of the flow of the work fluid, every exchanger for the user fluid to be heated is connected on entering to a point downstream of a respective regenerative exchanger and on exit to a point at the entrance of the same regenerative exchanger.

The part of the derived flow of the work fluid is withdrawn from and returned to a regenerative exchanger by means of a pump that can be placed downstream or upstream of the user exchanger crossed by the user fluid to be heated.

For a control of the capacity of work fluid through the line connecting every user exchanger and respective regenerative exchanger regulation means can be provided constituted by adjustable valves or by the same pump associated with the user exchanger that can be at a variable rotation speed or of the volumetric type with variable capacity.

BRIEF DESCRIPTION OF THE DRAWINGS

The invention, however, will be better explained in detail in the continuation of the description, with reference made to FIGS. 1, 2, 3 and 4 already defined previously and in the appended drawings, in which the same numerical references are used so as to indicate parts or components, equal or equivalent to those schematized in FIG. 1. In the further drawings.

DETAILED DESCRIPTION OF THE INVENTION

Figure 5:
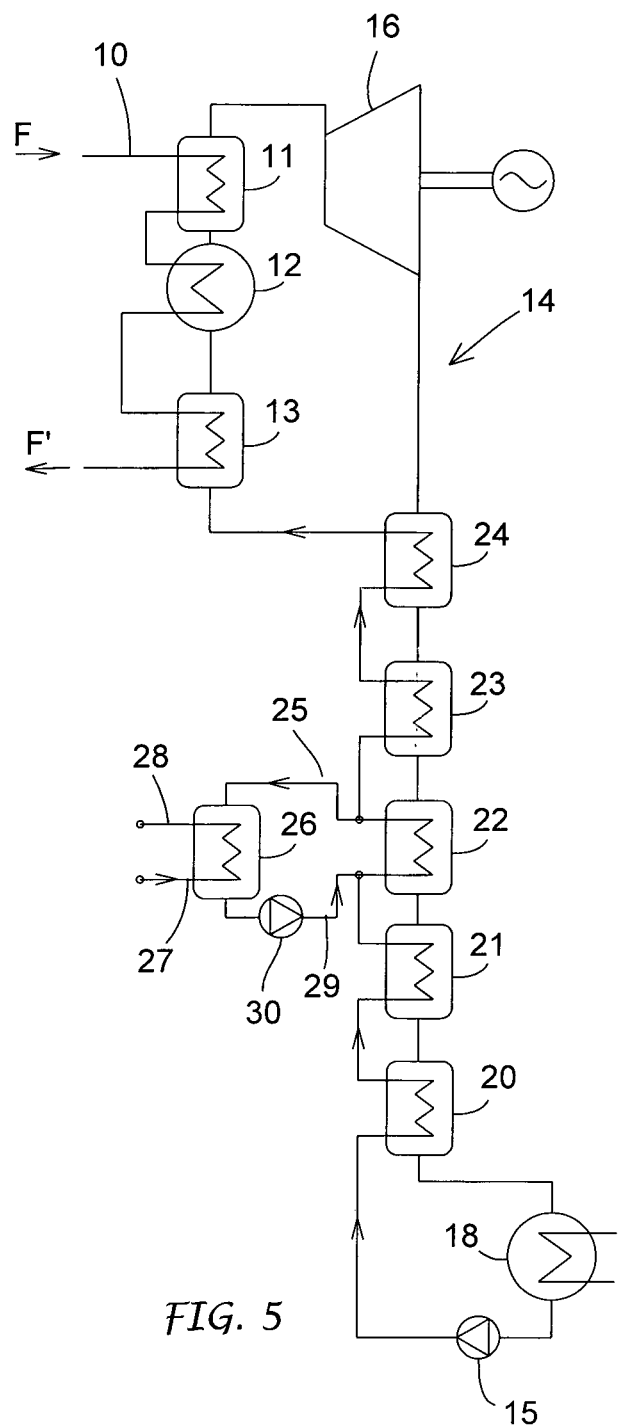
FIG. 5 shows parts of an ORC system configured according to the invention, with more regenerative exchangers and a single user exchanger.

According to the invention, the normal regenerator 17 of an ORC system as shown in FIG. 1, which is at the most made up of a so-called "shell and tube" thermal exchanger with smooth or ribbed tubes, or by a ribbed pack exchanger with the liquid in the tubes and the vapour on the ribbed side, is substituted by a plurality n of regenerative exchangers 20-24, with n being equal to at least two, positioned in series along the route of the work fluid vapour coming from the expander group 16, as shown in FIG. 5. Each of a number m (less than n) of said regenerative exchangers 20-24, in FIG. 5 the regenerative exchanger 22, is provided with an offtake line 25 that draws at least a part of the flow of liquid work fluid downstream of the regenerative exchanger itself.

The drawn flow of fluid then pass through, preferably countercurrent, an additional heat exchanger 26 in which the drawn work fluid yields heat to a user fluid that enters into said heat exchanger through a line 27 and exits through line 28. Every following additional heat exchanger 26 will be named exchanger-user, because the fluid drawn from a regenerative exchanger circles there plus the user fluid such as one of the thermal elements of the co-generator system.

The flow of the drawn liquid is then returned, by means of a line 29, at the entrance of the regenerative exchanger 22 from which it was drawn. A pump 30 supplies the necessary head to guarantee the withdrawal and the return of the head.

The adjustment of the capacity of fluid drawn from the regenerative exchanger 22 can be carried out by means of an opportune adjustment of the pump 30 (as an example it could be a pump with a variable rotation speed or a volumetric pump with a variable displacement), or it could take place by means of valves—not indicated in the drawings—according to known technique.

Figure 6:
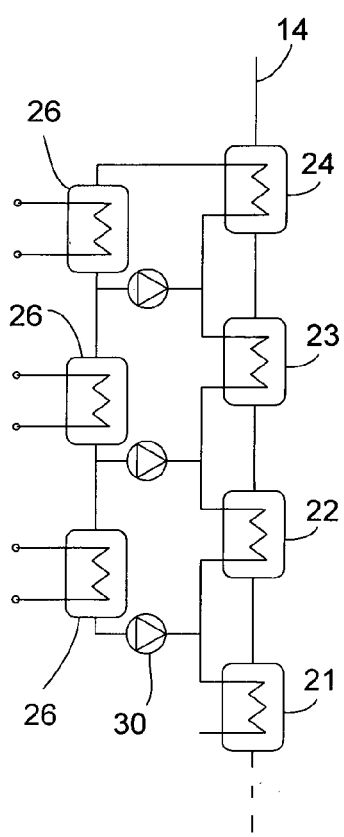
FIG. 6 shows a variation in the system in FIG. 5 with more user exchangers connected to as many adjacent regenerative exchangers.

In the case in which two or more adjacent exchangers-users 26 are dedicated to the co-generative function, the connection lines to the respective regenerative exchangers, for example 22-24, can eventually be unified as indicated in FIG. 6. Each with a relative pump 30.

The pump or pumps 30 necessary the head for the drawing and return of the flow fluid can be positioned both upstream and downstream of the exchangers-users. The drawing of work fluid for the transfer of heat in the exchanger-user 26 implies an increase of the rate of flow in the regenerative exchange a drop or an increase of the input temperature to the regenerative exchanger depending on the thermal power deducted correlated to the rate of fluid deducted.

Practically, a high deduction of heat sent to the user fluid leads to a generalized increase of the difference in temperature between the vapour that releases heat in the regenerative exchanger and the liquid that goes through the same exchanger and therefore increases the thermal power deducted from the vapour that has repercussions along all the regenerators 20-24. The effect of the increase in the exchange of heat is elated by the fact that to increase the capacity of flow of liquid the speed of the liquid in the thermal exchange also becomes on being incremented and also the coefficient of the laminar thermal exchange between fluid and wall of the exchanger. Moreover also the load losses increase.

Figure 7:
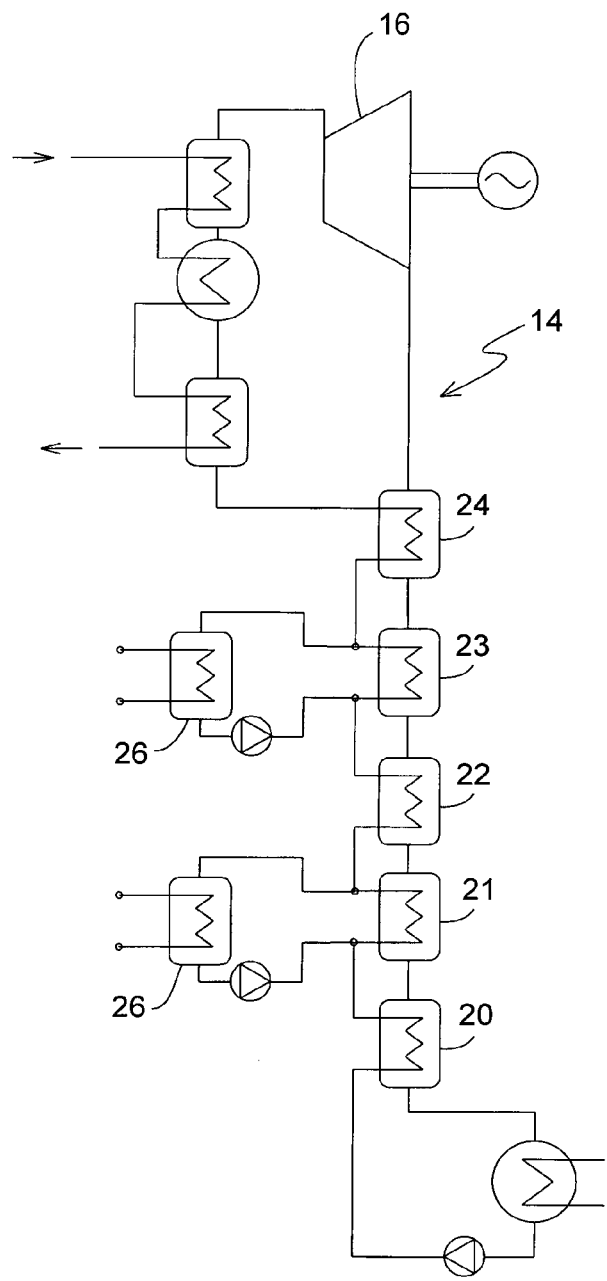
FIG. 7 shows a further variation of the system in FIG. 5, with user exchangers connected to regenerative exchangers at different temperatures.

In FIG. 7, there is an exemplifying scheme with reference to a system provided with two thermal exchangers-users 26 at different temperatures, that justify the adoption of the drawing of a capacity of fluid by non adjacent exchangers, for example 21, and 23, so as to minimize the entropy generation due to the thermal exchange.

Figure 8:
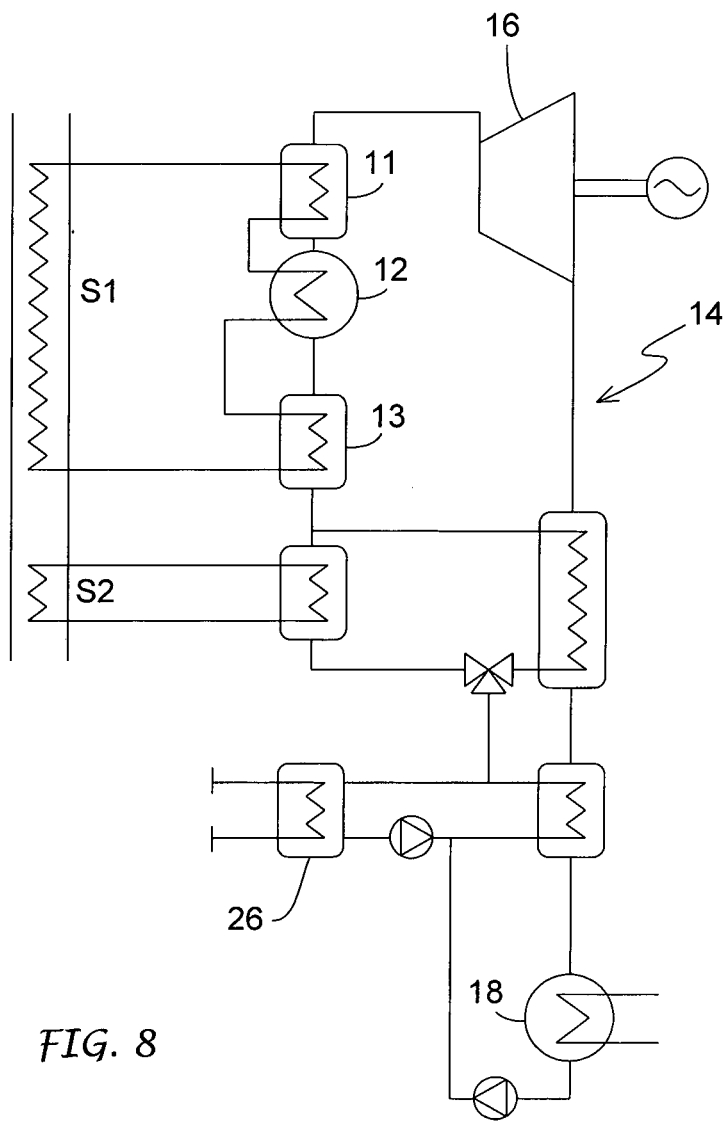
FIG. 8 shows a variation of the system in FIG. 5 configured with at least one secondary thermal source for the introduction of heat in the work fluid.

Within the ambit of the invention also the adoption in addition to the main thermal source S1, re-enters one or more secondary thermal sources S2 set up for the introduction of heat in the work fluid, with a reduced capacity of flow, according to a know technique, sometimes named a "split". In FIG. 8 there is represented a part of an ORC system provided with said system, and incorporating also the invention, applying for example a first regenerative exchanger level.

The secondary thermal source S2 is then characterized by the fact of having a lower capacity of flow compared with the main source S1. One of the most frequent cases used is comparable to the one represented in FIG. 8 exists, for example, when the heating sources is made up of a boiler for the combustion of biomass associated with the electric ORC production, and comprises a first thermal exchange system S1 with the gas of the combustion in a boiler and a second thermal exchange system S2 in series on the path of the fumes downstream of S1, provided with a lower capacity of flow and with a lower input temperature of the thermal vector compared to the input temperature of the thermal vector in S1.

The adoption of a drawing of a flow fluid according to the present invention, as in the previous cases, allow supply power to a thermal user without resorting to external sources to the ORC system and to without having to increase the condensation temperature, with a consequent drop in the productivity of the system. The presence of the "split" exchanger is to all effects compatible with the adoption of the invention at any thermal level inside the regenerator.

Figure 9:
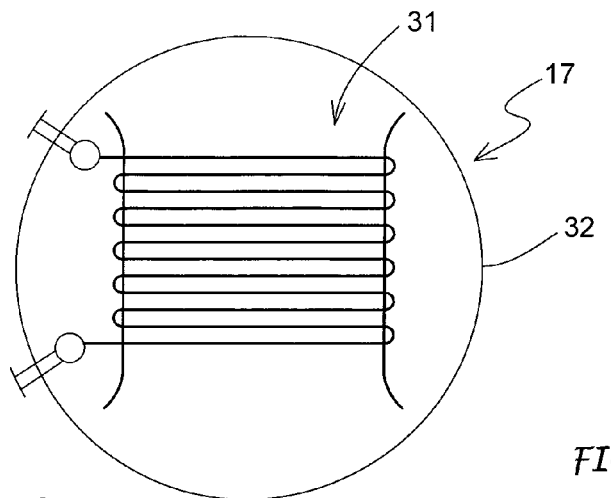
FIGS. 9, 10 and 11 show, schematically, as many examples.
Figure 10:
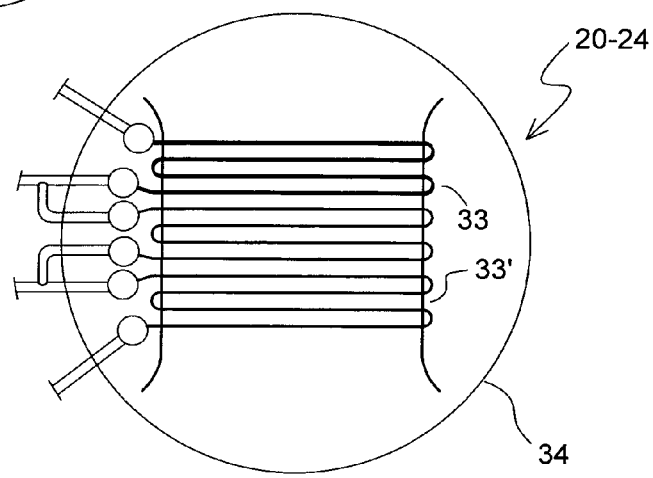
Figure 11:
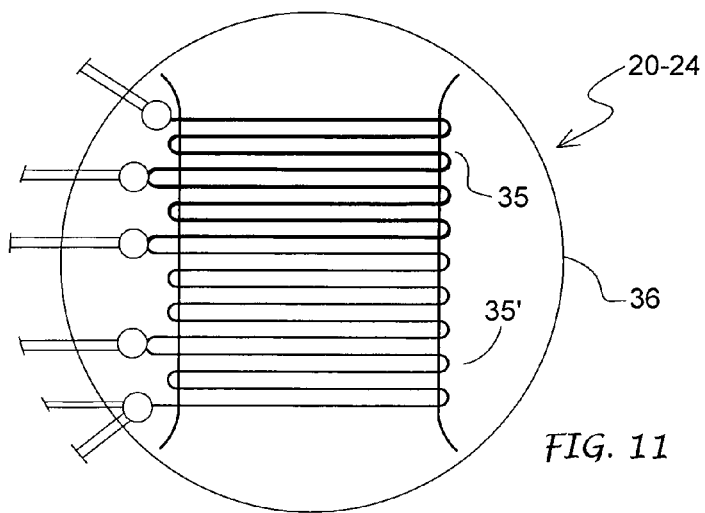

From the point of view of a mechanical realization, in FIG. 9 is represented a conventional regenerative exchanger 17 with a ribbed pack or with a matrix of ribbed coil tubes 31 in a relative covering 32, whereas FIG. 10 shows a regenerative exchanger with a set of coils or separated packs 33, 33' placed in series in a covering 34, each with an input manifold and one with an exit of the liquid. They are considered both the case with a connection inside the covering and on the outside. In FIG. 11, instead, there is represent a regenerative exchanger with groups of diversified tubes 35, 35' in a relative covering 36 and in which in the place of two adjacent manifold there is one single manifold that receives both underlying and overhanging tubes.

In any case, and preferable, in order to compensate the greater capacity of liquid from every interesting regenerative exchange in the pack with a collection of liquid, larger diameter tubes or a major number of tubes in parallel can be used so as to avoid increase of the losses of load.

The invention claimed is:

1. ORC system (Organic Rankine Cycle) at least partially co-generative for the production of electric energy and the heating of a user fluid, the system comprising:
   at least one main thermal source (S1) of heating of a fluid vector,
   a primary circuit covered by the fluid vector, that comes from said thermal source, put into circulation by at least a recycling pump,
   a thermal exchange group for the exchange of heat between the vector fluid and a work fluid circulating in a relative work fluid circuit by means of a pump,
   an electric expander-generator group supplied in the entrance by the work fluid exiting from said thermal exchange group, and
   at least one condenser group connected to the exit of the electric expander-generator group,
   at least two regenerative exchangers positioned in series on the path of the work fluid between the exit of the electric expander-generator group and the condenser inlet of the ORC system, and by a heat exchanger-user connected by means of an offtake line to at least one of said regenerative exchangers to receive from it a part of the rate of flow of the work fluid and crossed by the user fluid to be heated by means of a thermal exchange with said rate of work fluid, and where the part of the rate of flow of the derived work fluid is returned to the same regenerative exchanger after having crossed the exchanger user.

2. A system according to claim 1, in which every the exchanger user crossed by the user fluid to be heated is connected on entering in a point downstream of a respective regenerative exchanger and on exiting in a point of the entrance of the same regenerative exchanger.

3. A system according to claim 1, in which the exchanger user crossed by the user fluid to be heated is associated a pump to draw and return the part of the rate of flow of the work fluid respectively downstream and in the entrance of the respective regenerative exchanger.

4. A system according to claim 3, in which said pump is on a line downstream or upstream of the exchanger user crossed by the user fluid to be heated.

5. A system according to claim 1, in which regulation means of the part of the rate of flow of work fluid through the offset connecting one exchanger user to a respective regenerative exchanger are foreseen.

6. A system according to claim 5, in which said adjustment means are made up by the pump associated with the exchanger user, said pump being able to be a pump with a variable rotation speed or a volumetric pump with variable capacity.

7. A system according to claim 5, in which said adjustment means are made up of adjustable valves.

8. A system according to claim 1, further comprising a secondary thermal source for the introduction of heat in the work fluid through the use of a heat exchanger fed by said secondary thermal source and crossed by a flow of work fluid drawn in derivation compared with at least a part of the regenerative exchangers.

9. A system according to claim 1, in which each regenerative exchanger includes, separated coils or packs of coils placed in series in the same covering, each pack with an entrance and an exit collector.

10. A system according to claim 9, in which the coils or packs of coils comprise tubes with a larger diameter on a level with the collection of a part of the flow rate of the work fluid from every regenerative exchanger.

11. A system according to claim 9, in which the coils or packs of coils comprise a larger number of tubes in parallel on a level with the collection zone and with a part of the rate of flow of work fluid from every regenerative exchanger.

* * * * *